(12) United States Patent
Bronez (10) Patent No.: US 7,706,340 B2
(45) Date of Patent: Apr. 27, 2010

(54) RELIABLE NEIGHBOR NODE DISCOVERY

(75) Inventor: Thomas Bronez, Vienna, VA (US)

(73) Assignee: The MITRE Corporation, McLean, VA (US)

( * ) Notice: Subject to any disclaimer, the term of this patent is extended or adjusted under 35 U.S.C. 154(b) by 881 days.

(21) Appl. No.: 11/402,826

(22) Filed: Apr. 13, 2006

(65) Prior Publication Data
US 2007/0242642 A1 Oct. 18, 2007

(51) Int. Cl.
H04H 20/16 (2008.01)
H04W 40/04 (2009.01)
H04W 28/12 (2009.01)

(52) U.S. Cl. .................. 370/338; 370/232; 370/255

(58) Field of Classification Search .................. None
See application file for complete search history.

(56) References Cited

U.S. PATENT DOCUMENTS

| | | | |
|---|---|---|---|
| 7,215,966 B2 * | 5/2007 | Joshi ..................... | 455/456.1 |
| 7,327,683 B2 * | 2/2008 | Ogier et al. .................. | 370/236 |
| 2003/0007461 A1 * | 1/2003 | Chen et al. .................. | 370/254 |
| 2003/0235158 A1 * | 12/2003 | Lee et al. .................... | 370/256 |
| 2004/0203805 A1 * | 10/2004 | Khawand ..................... | 455/448 |
| 2004/0248578 A1 | 12/2004 | Korpela et al. | |
| 2005/0111428 A1 * | 5/2005 | Orlik et al. .................. | 370/344 |
| 2006/0039371 A1 * | 2/2006 | Castro et al. ................. | 370/389 |
| 2008/0037477 A1 * | 2/2008 | Axelsson et al. ............ | 370/338 |
| 2008/0137580 A1 * | 6/2008 | Axelsson et al. ............ | 370/315 |

OTHER PUBLICATIONS

International Search Report for PCT/US06/14058, dated Aug. 16, 2007, 2 pages.
Chakeres, Ian D. et al., "The Utility of Hello Messages for Determining Link Connectivity," *Proceedings of the 5th International Symposium on Wireless Personal Multimedia Communications (WPMC)* 2002, Honolulu, Hawaii, Oct. 2002, 5 pgs.
Lundgren et al., "The Gray Zone Problem in IEEE 802.11b based Ad hoc Networks," *Mobile Computing and Communications Review*, 6:3, pp. 104-105, 2002.

* cited by examiner

*Primary Examiner*—Rafael Pérez-Gutiérrez
*Assistant Examiner*—Frank Donado
(74) *Attorney, Agent, or Firm*—Sterne Kessler Goldstein & Fox, P.L.L.C.

(57) ABSTRACT

Methods and systems for reliable neighbor discovery in wireless ad hoc networks are provided herein. In one aspect, embodiments of the present invention provide methods and systems for analyzing the quality of a communication link. In embodiments, several factors affecting link quality may be incorporated in the analysis, and basic and/or complex statistical and/or probabilistic analysis may be used. In another aspect, embodiments of the present invention provide methods and systems for neighbor node discovery that adapt to network and/or node operating conditions and that dynamically maintain a neighbor node set at a given node according to these conditions. In a further aspect, embodiments of the present invention extend the utility of neighbor node discovery beyond the customary role of data routing support into the problem of deploying an ad hoc network by providing a display module for displaying node connectivity information.

13 Claims, 5 Drawing Sheets

RELIABLE NEIGHBOR NODE DISCOVERY

Statement under MPEP 310. The U.S. government has a paid-up license in this invention and the right in limited circumstances to require the patent owner to license others on reasonable terms as provided for by the terms of Contract No. W15P7T-05-C-F600, awarded by the U.S. Army.

FIELD OF THE INVENTION

The present invention relates generally to wireless ad hoc networking. More particularly, the invention relates to methods and systems for reliable neighbor discovery in wireless ad hoc networks.

BACKGROUND OF THE INVENTION

Over the last decade, multihop routing for wireless ad hoc networks has been the focus of numerous research efforts. With a multitude of routing protocols having been proposed, a common challenge is faced in the ability of the protocol to adapt to the expected but unpredictable topological changes in wireless ad hoc networks.

In the literature, this is known as routing topology control and is defined as the act of computing and maintaining a connected topology among network nodes, based on which data routing may be performed in the network.

While topology control continues to receive considerable research attention, an essential element at the basis thereof—neighbor node discovery—remains severely overlooked and is often simplistically treated in the design of routing protocols. Neighbor node discovery relates to the process by which a network node detects and dynamically maintains a neighbor node set, wherein the neighbor node set includes network nodes with which direct symmetric communication links are present. By direct it is meant that there is no need to communicate through intermediate nodes.

Conventional methods for neighbor node discovery rely on a simple hello-reply exchange for detecting a neighbor node. However, while this approach may work in simulation, in practice, the success or failure of a single exchange does not accurately describe the presence or absence of a reliable communication link between two nodes.

What is needed therefore are methods and systems for reliable neighbor node discovery to support efficient data routing in wireless ad hoc networks.

BRIEF SUMMARY OF THE INVENTION

Methods and systems for reliable neighbor discovery in wireless ad hoc networks are provided herein.

In one aspect, embodiments of the present invention provide methods and systems for analyzing the quality of a communication link using only network-level data transmission and reception. In embodiments, several factors affecting link quality may be incorporated in the analysis, and basic and/or complex statistical and/or probabilistic analysis means may be used.

In another aspect, embodiments of the present invention provide methods and systems for neighbor node discovery that adapt to network and/or node operating conditions and that dynamically maintain a neighbor node set at a given node according to these conditions.

In a further aspect, embodiments of the present invention extend the utility of neighbor node discovery beyond the customary role of data routing support into the problem of deploying an ad hoc network by providing a display module for displaying node connectivity information.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit (s) in the corresponding reference number.

DETAILED DESCRIPTION OF THE INVENTION

Wireless Ad Hoc Networks

Wireless ad hoc networks consist of geographically distributed nodes that communicate with one another over a wireless medium. Wireless ad hoc networks date back to Packet Radio Networks (PRNs) and Survivable Radio Networks (SRNs) developed by DARPA in the early 1970s and in the 1980s.

Today, with the ever increasing popularity of mobile telephony and personal digital assistants, a number of potential commercial applications of wireless ad hoc networks have been brought to the forefront. Examples of such applications include disaster relief, conferencing, home networking, sensor networking, personal area networking, and embedded computing applications.

Unlike wireless networks with infrastructure, such as cellular networks for example, ad hoc networks have no fixed infrastructure. Accordingly, ad hoc network nodes are envisioned to self-configure into a network, whereby network control may be distributed among all the nodes in the network.

Further in contrast to cellular networks, data communication in wireless ad hoc networks is peer-to-peer. In other words, data communication may take place between any two nodes in an ad hoc network. However, given the lack of infrastructure and the characteristically limited node capabilities in an ad hoc network, data communication must generally be performed in a multihop fashion.

Figure 1:
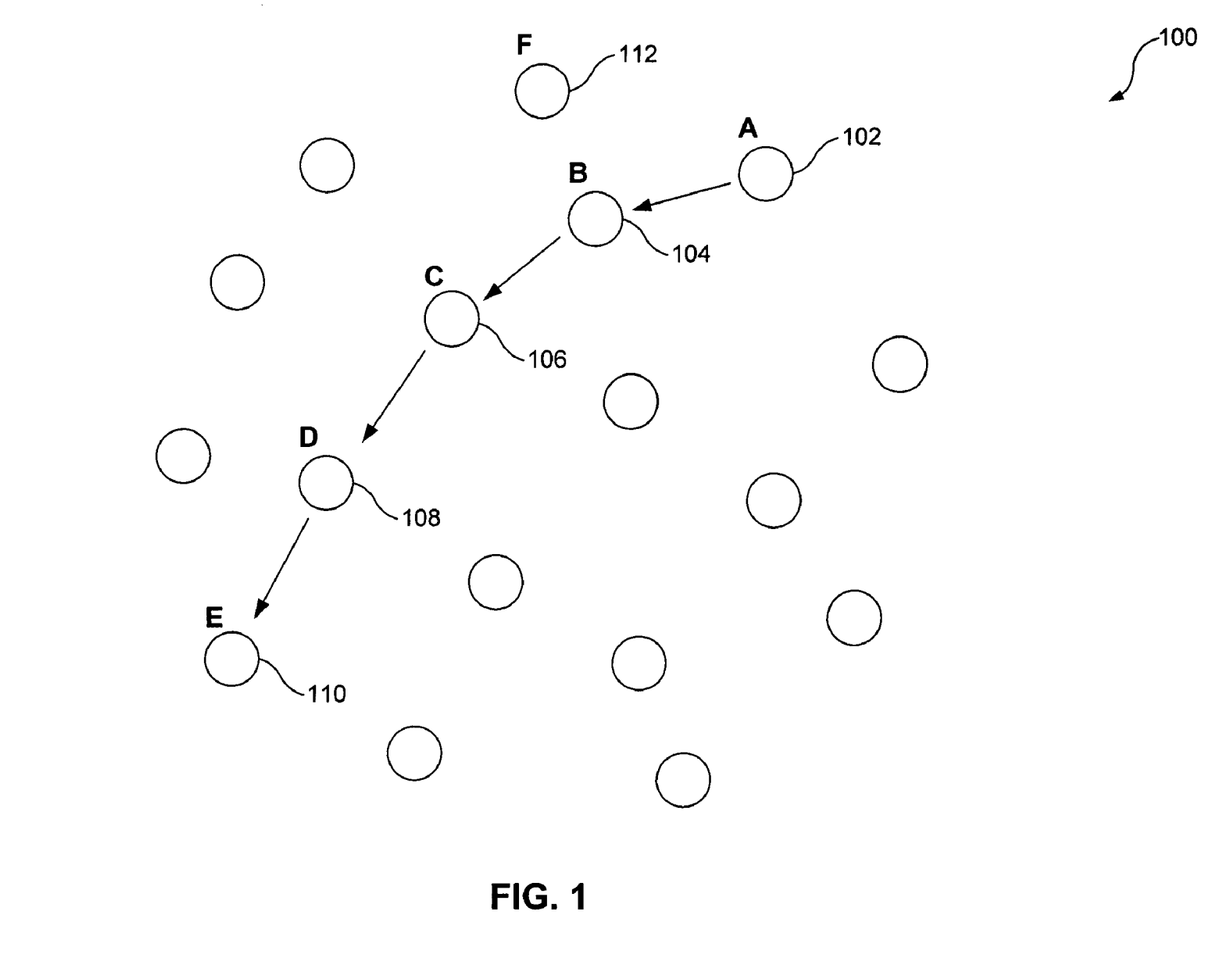
FIG. 1 is an example illustration of a wireless ad hoc network.

Accordingly, a data packet in an ad hoc network may have to traverse multiple nodes in the network before reaching its intended destination. FIG. 1 is an example illustration of a wireless ad hoc network 100. Wireless ad hoc network 100 includes a plurality of nodes that communicate wirelessly with each other. Nodes that are within communication (transmission and reception) range of each other are said to be neighbor nodes, and may communicate using direct links with one another. Non-neighbor nodes employ intermediate nodes to communicate according to a multihop routing scheme. For example, as shown in FIG. 1, node A 102 communicates with non-neighbor node E 110 in 4 hops using intermediate nodes B 104, C 106, and D 108. On the other hand, node A 102 may communicate directly with node F 112 given that node F 112 is within communication range thereof. In practice, the ability to support communication between two particular nodes is a complicated function of the nodes and their environment, depending not only on the inter-node distance but also the presence of obstructions in the intervening space, interference at either node, individual node characteristics (including antenna gain, antenna orientation, and radio data rate), and other nearby nodes (through their use of the same radio bandwidth to carry network traffic). Therefore, the ability to communicate can quickly appear or disappear with changing conditions, especially when the nodes are mobile.

Neighbor Discovery in Wireless Ad Hoc Networks

As described above, reliable neighbor node discovery is essential for accurate routing topology control in wireless ad hoc networks, and subsequently for supporting efficient routing protocols for these networks.

In the art, neighbor node discovery remains severely overlooked, and the majority of routing protocols for wireless ad hoc networks rely on simple hello-reply exchange schemes for performing neighbor node discovery.

Figure 2:
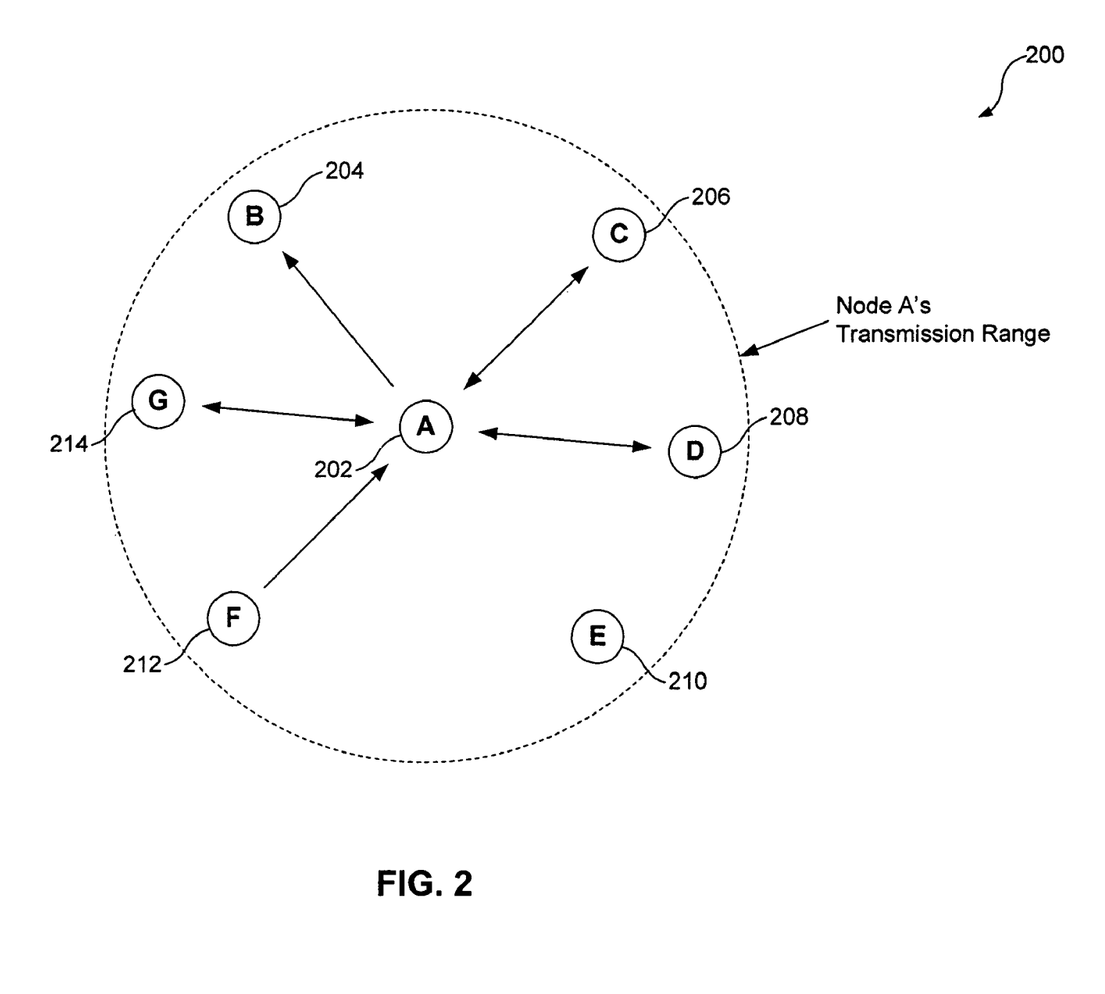
FIG. 2 is an example illustration of the neighbor node discovery problem.

A drawback of these schemes is clearly that a simple hello-reply exchange is, in practice, not sufficient to accurately describe the condition of a communication link. FIG. 2 is an example 200 that illustrates the complexity of the neighbor node discovery problem.

Example 200 illustrates a wireless node A 202 having six adjacent nodes B 204, C 206, D 208, E 210, F 212, and G 214. For illustration purposes only, the transmission range of node A 202 is shown as a uniform circle that includes nodes B 204, C 206, D 208, E 210, F 212, and G 214. In practice, the transmission range of a wireless node is not a uniform circle as shown in FIG. 2, for the reasons described above. A single-ended arrow from node A 202 to node B 204 denotes a one-way communication link from A 202 to B 204. A double-ended arrow between nodes A 202 and C 206 denotes a two-way communication link between A 202 and C 206. Accordingly, the link between A 202 and B 204 is said to be asymmetric. The link between A 202 and C 206 is a symmetric link.

A variety of factors determine whether a given communication link is symmetric or asymmetric. For the purpose of routing in the majority of ad hoc networking applications, neighbor node discovery entails discovering nodes with which reliable symmetric communication links are present. By this it is meant that network traffic can be communicated from a node to its neighbor with high probability of reception by the neighbor.

In example 200, nodes B 204, C 206, D 208, E 210, F 212, and G 214 are all theoretically within node A's transmission range. In practice, however, not all of nodes B 204, C 206, D 208, E 210, F 212, and G 214 may be able to successfully receive data packets broadcast by node A 202 with high probability. For example, receiver sensitivity at node F 212 may preclude node F 212 from successfully receiving data packets broadcast from node A 202 which have low signal-to-noise SNR ratio. On the other hand, moving objects in the neighborhood of node E 210 or mobility of node E 210 may prevent reliable communication between nodes A 202 and E 210.

Accordingly, in example 200, the neighbor node set of node A 202 includes nodes C 206, D 208, and G 214. However, due to volatility of conditions in wireless ad hoc networks, the neighbor node set is not a fixed set and will vary according to changes in network conditions, environmental conditions, and node mobility.

In addition to the above mentioned factors, which may be uncontrollable by a network designer, other controllable factors that affect link quality exist, such as dynamic radio characteristics like packet size, data rate and transmission power.

For example, the data transmission rate used in communicating over a link may determine that link's error rate, and subsequently the quality of the link. Further, a link's error rate may vary according to the size of packets being transmitted over that link. For example, smaller data packets are generally less prone to bit errors and have a lower probability of colliding with other packets being broadcast in the network than larger data packets.

Accordingly, link quality is a complex function of various factors, both controllable and uncontrollable, and may not be accurately described by the success or failure of a simple hello-reply exchange as is done in the art. Further, efficient data routing in an ad hoc network requires that a certain level of confidence is established about the persistence in quality of a communication link before adopting that link in routing.

The present invention provides methods and systems for reliable neighbor node discovery.

In one aspect, embodiments of the present invention provide schemes that encompass a variety of factors, as described above, in the determination of link quality.

In another aspect, embodiments of the present invention provide measures to analyze the persistence of a communication link before making a decision about the reliability of that link. In embodiments, basic and/or complex statistical and/or probabilistic analysis may be used.

In a further aspect, embodiments of the present invention provide methods and systems for neighbor node discovery that adapt to network and/or node operating conditions and that dynamically maintain a neighbor node set at a given node according to these conditions.

Methods and Systems for Reliable Neighbor Node Discovery

Methods and systems for reliable neighbor node discovery will now be provided. In the description below, various parameters for measuring link quality, which may be employed in embodiments of the present invention, will be described. Equivalent parameters and/or parameters that may be used for the equivalent purpose of evaluating link quality also exist. Accordingly, it should be understood that methods and systems according to the present invention should not be limited to those using the parameters described herein, and that schemes using equivalent and/or other parameters are also within the scope of the present invention.

Further, in the course of the description below, various methods and systems for generating hello/reply message statistics and for analyzing said statistics are provided. The present invention is not limited to the methods and systems provided herein. As equivalent ones exist, they are also within the scope of the present invention. This similarly applies to hello/reply message data, hello/reply message statistics, statistical decision parameters, hello/reply message characteristics, and network conditions as described below.

Figure 3:
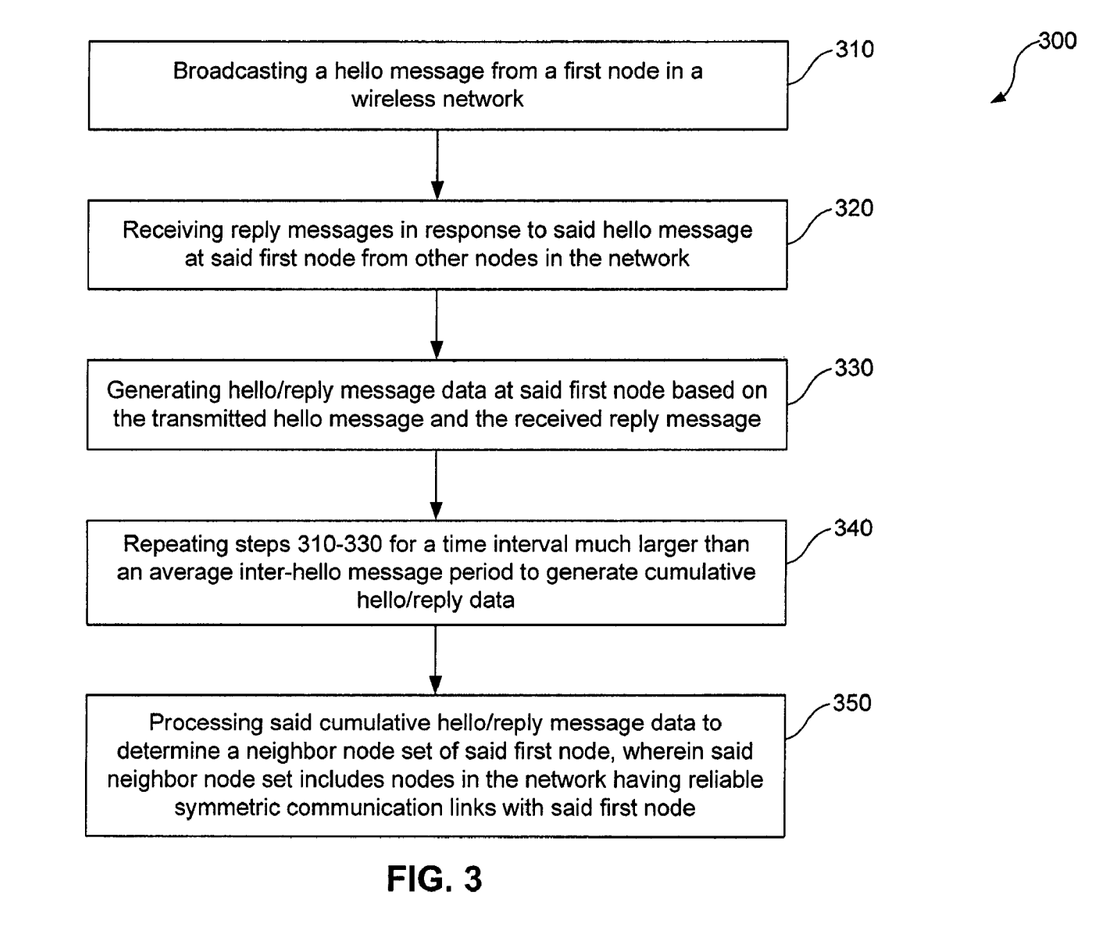
FIG. 3 is a process flowchart for reliable neighbor node discovery.

FIG. 3 is a process flowchart 300 for reliable neighbor node discovery in a wireless network having a plurality of nodes.

Process flowchart 300 begins in step 310, which includes broadcasting a hello message from a node in the network. In an embodiment, the node has several network nodes within transmission range thereof, which may be able to successfully receive packets broadcast by the node. Further, nodes successfully receiving the broadcast hello message may reply to acknowledge the reception of the message and to notify the broadcasting node of their presence.

Accordingly, step 320 includes receiving at the broadcasting node reply messages in response to the broadcast hello message from other nodes in the network. In an embodiment, reply messages may be broadcast in the network or directly unicast to the broadcasting node. A reply message received at the broadcasting node from another node in the network indicates that a communication link might exist between the two nodes; however, the quality and utility of that link remains to be established.

Upon receiving reply messages, step 330 includes generating hello/reply message data at the broadcasting node based on the broadcast hello message and the received reply messages. In an embodiment, the generated hello/reply message data may include any type of data that may be used to infer link quality information between the broadcasting node and its neighboring nodes. For example, the generated hello/reply message may include, among other parameters, hello/reply message characteristics, origin addresses of the received reply messages, latencies associated with the received reply messages, and/or a variable-length dummy payload to pad the message to a size commensurate with desired traffic packets.

According to embodiments of the present invention, hello/reply message characteristics may include, among other parameters, hello/reply message size, hello/reply message frequency, hello/reply message error rates as a function of packet size and radio transmission rate, and/or equivalents thereof, each of which may be used to estimate link quality for data transmission. For example, as described above, link quality varies according to message size in that shorter messages are typically more likely to be received successfully over a noisy link than longer messages. Accordingly, as hello/reply messages are typically of smaller size than data messages, it is important to take into account message size when inferring link quality for data message transmission.

Similarly, hello/reply message error rates as well as latencies associated with the received reply messages may be used as indicators of link quality.

Referring back to FIG. 3, step 340 includes repeating steps 310-330 for a time interval much larger than an average inter-hello message period to generate cumulative hello/reply data. The average inter-hello message period represents an average time duration between two consecutive hello message broadcasts, and may be specified as a function of network and/or node operating conditions as well as the specific ad hoc networking application. In an embodiment, the time interval of step 340 is of sufficient duration to encompass several hello/reply exchanges and to generate a reasonably large sample of hello/reply data, which may be used to accurately analyze link quality. For example, the neighbors of a node carried by a pedestrian might be expected to change over the course of a second; in that case, the average inter-hello message period would be on the order of a tenth of a second.

Step 350 includes processing the cumulative hello/reply data to determine a neighbor node set of the broadcasting node. The neighbor node set includes network nodes with which the broadcasting node has reliable symmetric communication links. In an embodiment, step 350 further includes generating hello/reply message statistics based on the cumulative hello/reply data. In an embodiment, the generated hello/reply message statistics include, among other parameters, average reply message latencies, reply message arrival probabilities, and/or equivalent measures thereof as a function of the varied parameters, such as message size, data rate, and transmit power.

In another embodiment, step 350 further includes monitoring network conditions and generating statistical decision parameters for analyzing the generated hello/reply message statistics. In an embodiment, the statistical decision parameters are generated based on, among other parameters, hello/reply message characteristics (described above), network conditions, and/or node operating conditions.

According to embodiments of the present invention, network conditions include network traffic conditions, network loading conditions, network connectivity conditions, and/or network volatility conditions. Different parameters and/or measures may be used to describe each of the noted network conditions as understood by a person skilled in the art. Node operating conditions may include, among other parameters, current neighbor node set, physical layer characteristics, and/or node receiver sensitivity.

As understood by a person skilled in the relevant art(s), each of the above noted parameters may affect link quality and can be used to infer information about link quality for data transmission. For example, a node's current neighbor node set may affect the probability of packet collision when communicating with the node. On the other hand, a node's physical layer may treat broadcast hello messages differently than unicast data messages (802.11, for example, transmits broadcast packets at a lower rate and without clear-to-send protection), resulting in different message reception rates for broadcast and unicast messages.

According to embodiments of the present invention, statistical decision parameters may be generated so as to incorporate any number of parameters that may affect link quality for data transmission. Further, statistical decision parameters as well as the type of analysis used may vary in complexity according to network and/or node operating conditions. For example, simple threshold analysis based on a decision threshold may be sufficient for network conditions that vary slowly. On the other hand, adaptive trend analysis based on more complex statistical decision parameters may be needed for rapidly changing network conditions.

Accordingly, to meet the typically volatile conditions of wireless ad hoc networks, embodiments of the present invention further include adjusting the hello/reply message characteristics, the statistical decision parameters, and/or the analysis type according to network and/or node operating conditions. This results in adaptive methods and systems for neighbor node discovery that track changes in network and/or node conditions, and that dynamically adjust the link quality analysis and input parameters thereof accordingly.

Figure 4:
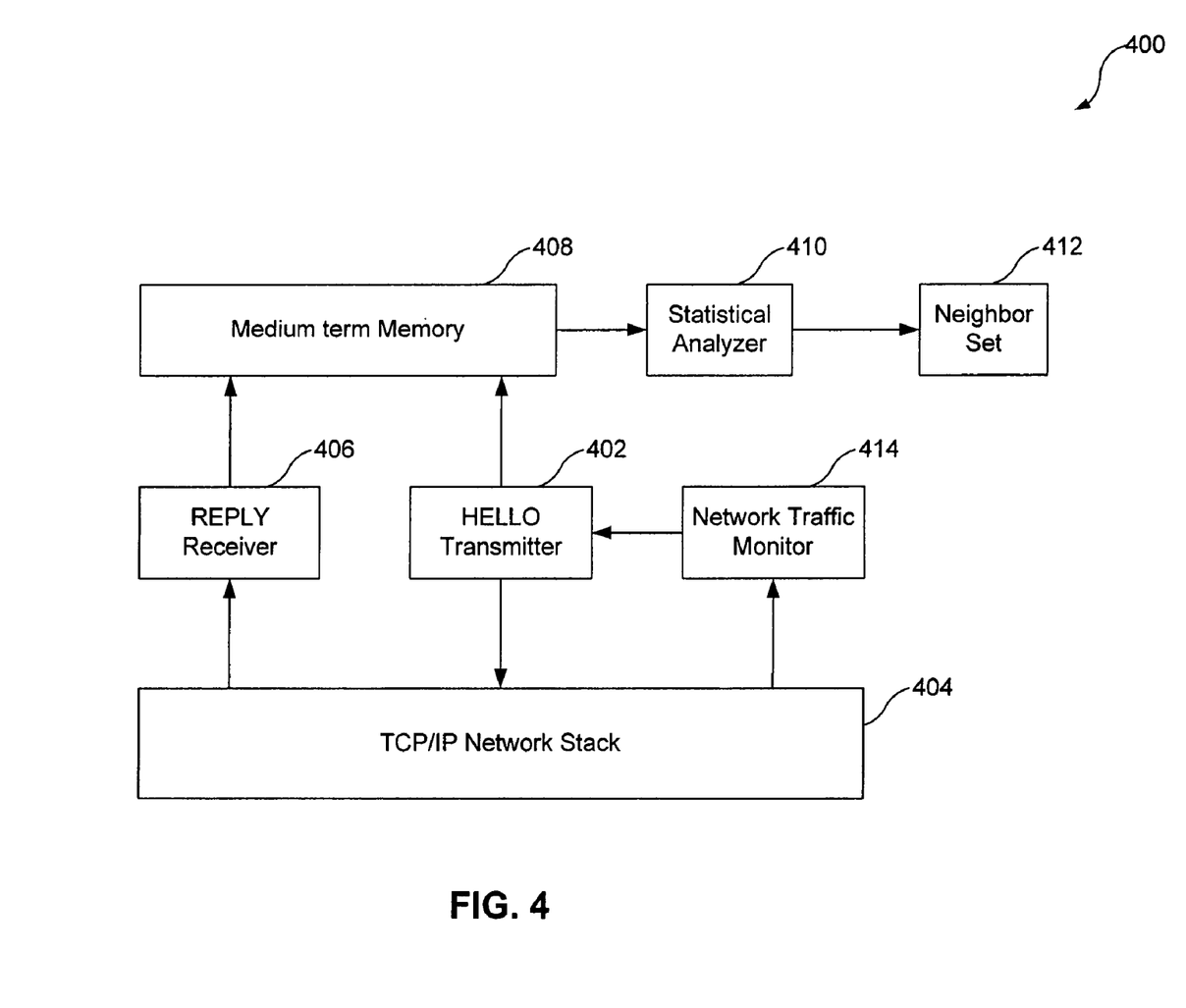
FIG. 4 is a block diagram of a system for reliable neighbor node discovery.

FIG. 4 is a block diagram of a system 400 for reliable neighbor node discovery that implements process flowchart 300 of FIG. 3. System 400 represents components of a neighbor node discovery module connected to a network interface. In an embodiment, system 400 may be part of a wireless node in a wireless ad hoc network.

System 400 includes a HELLO transmitter module 402, a REPLY receiver module 406, a medium term memory 408, a statistical analyzer module 410, a neighbor set module 412, a TCP/IP network stack 404, and a network traffic monitor 414. The operation of system 400 according to process flowchart 300 will now be described.

HELLO transmitter module 402 generates and forwards a hello message to TCP/IP Network Stack 404. In an embodiment, HELLO transmitter module 402 may generate hello messages according to an inter-hello message period. The inter-hello message period may be fixed or variable and may be specified as a function of network conditions.

Each generated hello message includes information for identifying the wireless node in the network. For example, the hello messages include a network address of the wireless node. Further, the hello messages may be of fixed or variable size. In an embodiment, HELLO transmitter 402, upon forwarding a hello message to TCP/IP network stack 404, saves message characteristics of the hello message in medium term memory 408.

TCP/IP network stack 404 connects system 400 to the wireless network. Accordingly, upon receiving the hello message from HELLO transmitter module 402, TCP/IP network stack 404 disseminates the hello message in the network. In an embodiment, TCP/IP network stack 404 performs a one-hop broadcast of the generated hello message. This means that the hello message is not forwarded by other nodes in the network that may receive it. In another embodiment, TCP/IP network stack 404 may notify HELLO transmitter module 402 of the precise time when the hello message is transmitted. HELLO transmitter module 402 may then record that information in medium term memory 408.

If the node using system 400 is within communication range of other network nodes, system 400 may receive reply messages from other nodes in the network. This is done by TCP/IP network stack 404 receiving reply messages and forwarding them to REPLY receiver module 406. REPLY receiver module 406 extracts information from the received reply messages, and forwards the extracted information to medium term memory 408 to be saved. In an embodiment, the extracted information includes message characteristics of reply messages as described above. In another embodiment, REPLY receiver 406 may compute latencies associated with communication links to neighbor nodes by examining receipt timestamps included in the received reply messages.

Network traffic monitor 414 monitors traffic though TCP/IP network stack 404, and may generate measures of network conditions based on the monitored traffic. In an embodiment, network traffic monitor 414 infers network loading conditions by monitoring traffic through TCP/IP network stack 404. In another embodiment, network traffic monitor 414 may generate traffic pattern (traffic burstiness, for example) data based on monitoring TCP/IP network stack 404.

Network traffic monitor 414 may communicate the generated data and/or information to HELLO transmitter 402, which may examine and save the data in medium term memory 408. In an embodiment, HELLO transmitter 402 may adjust certain characteristics of hello messages based on data received from network traffic monitor 414 such as message length, data rate, and transmission rate.

Following several inter-hello message periods, medium term memory 408 contains a sufficient amount of hello/reply data to generate meaningful statistics for describing link quality between the wireless node and neighbor nodes thereof. In an embodiment, statistical analyzer 410 uses data saved in medium term memory 408 to generate hello/reply statistics that may be used to analyze link quality. In an embodiment, the hello/reply statistics include average reply message latencies, reply message arrival probabilities, and/or equivalent measures thereof as a function of the varied parameters, such as message size, data rate, and transmit power.

Further, statistical analyzer 410 generates statistical decision parameters for analyzing the generated hello/reply statistics. In an embodiment, statistical decision parameters may be generated so as to incorporate any number of parameters that may affect link quality for data transmission. In another embodiment, statistical decision parameters may vary according to the type and complexity of analysis used by analyzer 410. For example, in a wireless ad hoc network having slowly changing conditions, a simple threshold analysis may be sufficient to analyze link quality. Accordingly, generating statistical decision parameters, in this case, involves applying a threshold to a count of successful exchanges having the desired characteristics (length, data rate, etc.) to determine whether a link can be classified as reliable or not. Generally, more sophisticated statistical analysis is required and may include, but is not limited to, maximum likelihood analysis, maximum a priori analysis, fuzzy logic analysis, and hidden Markov model analysis.

Statistical analyzer 410 analyzes the reliability of neighbor communication links based on the generated hello/reply message statistics and using the generated statistical decision parameters. As discussed above in the description of process flowchart 300, several factors, including network conditions and node operating conditions, may be incorporated in this statistical analysis. Subsequently, statistical analyzer 410 determines the set of neighbor nodes with which reliable symmetric communication links are present, and stores this set in neighbor set module 412. Neighbor set module 412 includes a means for exposing the neighbor node set to users via visual or audible indicators and/or application processes via memory and/or or file-based mechanisms.

Figure 5:
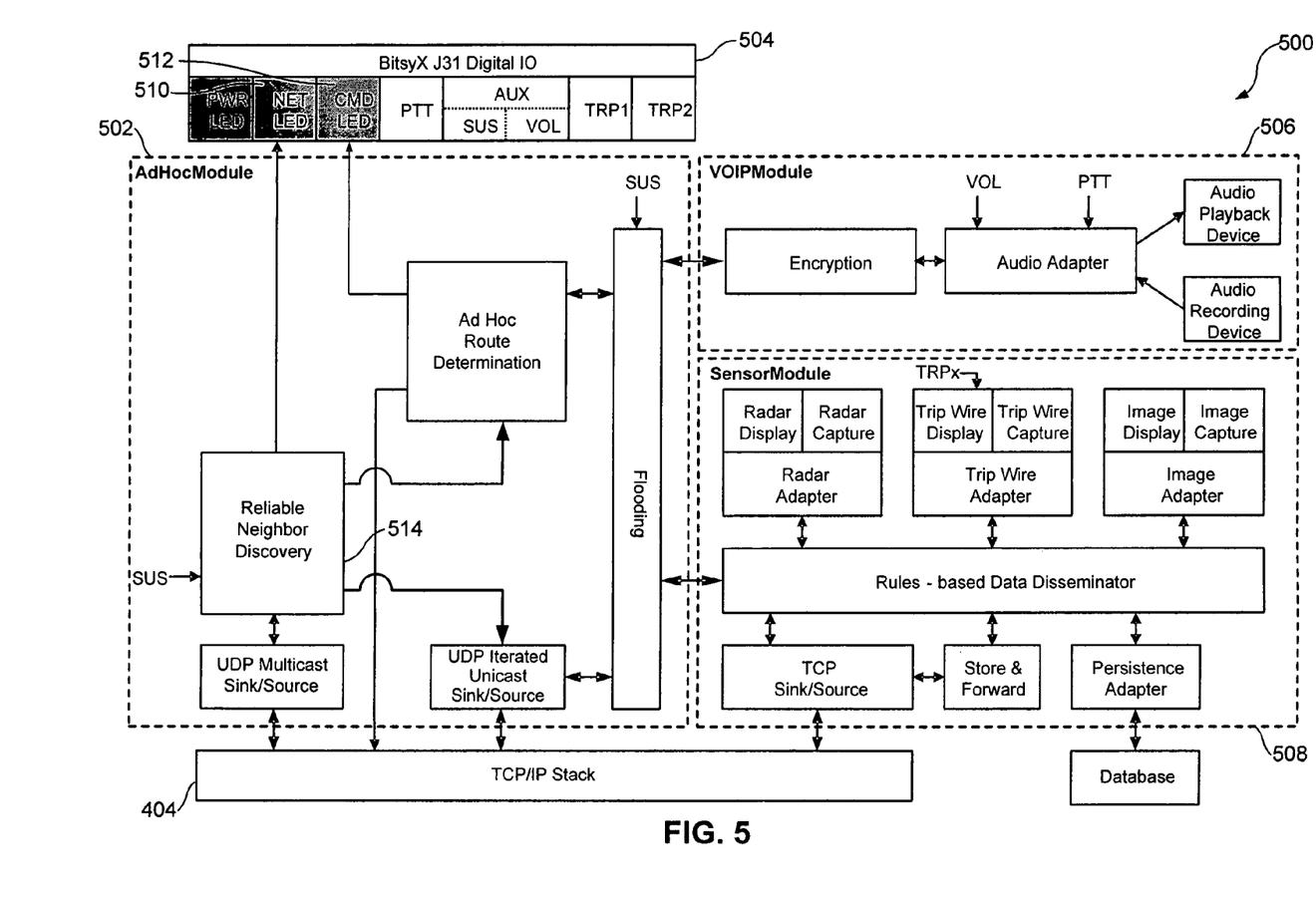
FIG. 5 is a block diagram of a wireless device having a neighbor node discovery module.

FIG. 5 is a block diagram of an example wireless device 500 having a neighbor node discovery module according to the present invention. Wireless device 500 includes an ad hoc networking module 502, a voice-over-ip (VOIP) module 506, a sensor module 508, and a display module 504.

Ad hoc networking module 502 includes a neighbor discovery module 514, which represents a reliable neighbor node discovery module as described above with respect to FIG. 4. The neighbor node discovery module adaptively generates and maintains a neighbor node set of wireless device 500. Ad hoc networking module 502 may also include a data routing module (illustrated using the Ad Hoc Route Determination module in FIG. 5) that determines routing paths from wireless device 500 to other nodes in the network. In an embodiment, the data routing module uses the neighbor node set generated by neighbor discovery module 514 in concert with neighbor node sets from other nodes to determine the routing paths either proactively or reactively.

VOIP module 506 and sensor module 508 represent data generation and/or reproduction modules. For example, VOIP module 506 includes an audio recording device for generating data for transmission and an audio playback device for reproducing data received from the network. Similarly, sensor module 508 includes several data generation components such as the data capture components and several data reproduction components such as the data display components.

Display module 504 displays network connectivity information of the wireless device, which can be used by a user of the device and/or the network.

Display module 504 includes one or more light emitting diodes (LEDs). In an embodiment, display module 504 includes a first LED 510 for indicating whether the neighbor node set is empty or not. In other words, the first LED 510 indicates whether the wireless device has any network nodes within reliable communication range. In another embodiment, display module 504 includes a second LED 512 to indicate whether a command node, which may include a central control entity of the network, is included in the neighbor node set of the wireless device. The second LED 512 may be useful in ad hoc networking applications that use command nodes, such as team communication applications, or data exfiltration/storage nodes, such as wireless sensor networking applications. Display module 504 is controlled by neighborhood module 514 based on the generated neighbor node set.

Display module 504 represents a novel feature according to the present invention. Indeed, display module 504 significantly simplifies the process of deploying an ad hoc network when the goal is to have a fully connected network with no partitions. In an embodiment, display module 504 can be used to determine where to place relay nodes in the network in order to maintain full connectivity in the network. Placement based on timely indication of reliable neighbors can be done conveniently and accurately by users with minimal training and without the need for sophisticated test equipment, such as radio frequency spectrum analyzers.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for neighbor node discovery in a wireless network having a plurality of nodes, comprising:
   (a) broadcasting a hello message from a broadcasting node in the network;
   (b) receiving reply messages in response to said hello message at said broadcasting node from other nodes in the network;
   (c) generating hello/reply message data at said broadcasting node based on the broadcast hello message and the received reply messages;
   (d) repeating steps (a)-(c) a plurality of times to generate cumulative hello/reply message data, wherein step (a) is repeated with one or more of variable hello message packet sizes and variable transmission data rates; and
   (e) processing at said broadcasting node said cumulative hello/reply message data to determine a neighbor node set of said broadcasting node, wherein said neighbor node set includes nodes in the network having reliable communication links with said broadcasting node.

2. The method of claim 1, wherein said hello/reply message data comprise at least one of hello/reply message characteristics, origin addresses of received reply messages, and latencies associated with received reply messages.

3. The method of claim 1, wherein step (e) further comprises:
   (1) generating hello/reply message statistics based on said cumulative hello/reply data.

4. The method of claim 3, wherein the generated hello/reply message statistics comprise at least one of average reply message latencies, reply message arrival probabilities, and equivalent measures thereof.

5. The method of claim 4, wherein step (e) further comprises:
   (2) monitoring network conditions; and
   (3) generating statistical decision parameters for analyzing said generated hello/reply message statistics.

6. The method of claim 5, wherein said statistical decision parameters are generated based on at least one of hello/reply message characteristics, network conditions, and node operating conditions.

7. The method of claim 6, wherein said hello/reply message characteristics comprise at least one of hello/reply message size, hello/reply message frequency, and hello/reply message error rates.

8. The method of claim 6, wherein said network conditions comprise at least one of network traffic conditions, network loading conditions, network connectivity conditions, and network volatility conditions.

9. The method of claim 6, wherein said node operating conditions comprise at least one of current neighbor node set, physical layer characteristics, and node receiver sensitivity.

10. The method of claim 6, further comprising:
    (4) dynamically adjusting said hello/reply message characteristics and said statistical decision parameters according to at least one of said network conditions and said node operating conditions.

11. The method of claim 5, wherein step (e) further comprises:
    (4) analyzing said hello/reply message statistics using the generated statistical decision parameters.

12. A method for neighbor node discovery in a wireless network having a plurality of nodes, comprising:
    (a) broadcasting a first message from a broadcasting node in the network;
    (b) receiving second messages in response to said first message at said broadcasting node from other nodes in the network;
    (c) generating message data at said broadcasting node based on the broadcast first message and the received second messages;
    (d) repeating steps (a)-(c) a plurality of times to generate cumulative message data, wherein step (a) is repeated with one or more of variable hello message packet sizes and variable transmission data rates; and
    (e) processing at said broadcasting node said cumulative message data to determine a neighbor node set of said broadcasting node, wherein said neighbor node set includes nodes in the network having reliable communication links with said broadcasting node.

13. An apparatus for neighbor node discovery at a node in a wireless network having a plurality of nodes, comprising:
    (a) means for broadcasting a hello message;
    (b) means for receiving reply messages in response to said hello message;
    (c) means for generating hello/reply message data based on the broadcast hello message and the received reply messages;
    (d) means for repeating steps (a)-(c) a plurality of times to generate cumulative hello/reply message data, wherein said means for repeating comprises means for repeating step (a) with one or more of variable hello message packet sizes and variable transmission data rates; and
    (e) means for processing said cumulative hello/reply message data to determine a neighbor node set, wherein said neighbor node set includes nodes in the network having reliable communication links with said node.

* * * * *